United States Patent [19]

Stoner

[11] Patent Number: 5,318,249

[45] Date of Patent: Jun. 7, 1994

[54] CURLED TRAILING EDGE AIRFOIL

[75] Inventor: Ronald C. Stoner, Bellevue, Wash.

[73] Assignee: The Boeing Company, Seattle, Wash.

[21] Appl. No.: 868,752

[22] Filed: Apr. 14, 1992

[51] Int. Cl.[5] .............................................. B64C 3/10
[52] U.S. Cl. ...................................................... 244/35 R
[58] Field of Search ................ 244/34 R, 35 R, 35 A, 244/213, 204, 198; 416/223 R

[56] References Cited

U.S. PATENT DOCUMENTS

| Re. 19,412 | 1/1935 | Zaparka | 244/12 |
|---|---|---|---|
| 1,786,472 | 12/1930 | Yates . | |
| 3,952,971 | 4/1976 | Whitcomb | 244/35 |
| 4,072,282 | 2/1978 | Fulker | 244/35 |
| 4,121,787 | 10/1978 | Wilby | 244/35 |
| 4,314,795 | 2/1982 | Dadone | 416/223 |
| 4,387,869 | 6/1983 | Englar | 244/207 |
| 4,413,796 | 11/1983 | Bousquet | 244/35 |
| 4,455,003 | 6/1984 | Hilbig | 244/35 |
| 4,542,868 | 9/1985 | Boyd | 244/198 |
| 4,718,619 | 1/1988 | Ashill | 244/35 |
| 4,858,852 | 8/1989 | Henne | 244/35 |

OTHER PUBLICATIONS

Barnes McCormick, *Aerodynamics, Aeronautics* and *Flight Mechanics,* 1979, Wiley Press, pp. 63-93.

*Primary Examiner*—Galen L. Barefoot
*Attorney, Agent, or Firm*—Townsend and Townsend Khourie and Crew

[57] ABSTRACT

An improved trailing edge configuration for a transonic airfoil is disclosed. The upper and lower surfaces converge without diverging over the aft 40% of the airfoil chord, and the airfoil has significantly increasing downward curvature at the aft end. The absolute value of the negative slope of the camber typically increases by at least 50% over the aft 4% of the chord, usually increasing by a factor of about 2. The negative slope of the camber of the airfoil typically reaches at least about $-0.25$ at the trailing edge of the airfoil, and in preferred designs, the slope of the camber changes from about $-0.175$ to about $-0.325$ over the aft 4% of the chord.

21 Claims, 3 Drawing Sheets ns/5,318,249

CURLED TRAILING EDGE AIRFOIL

BACKGROUND OF THE INVENTION

The present invention relates to airfoils designed to delay the onset of the drag rise associated with transonic flight.

The parasite drag on an aircraft includes both viscous drag, resulting from the viscosity of the air, and pressure drag, resulting from an imbalance of pressures acting on the aircraft surfaces. At subsonic velocities, the viscous drag is the predominant contributor to the parasite drag of the aircraft. However, as the aircraft approaches Mach 1.0, local regions of supersonic flow develop on the surface of the aircraft. For local Mach numbers nearly equal to 1.0, the air is able to recompress (return to subsonic conditions) without forming local pressure jump discontinuities or shocks on the surface of the aircraft. At higher aircraft Mach members, local regions of supersonic flow develop for which it is no longer possible for the air to re-compress without a local pressure jump, or shock wave. This increased pressure drag is referred to as wave drag. Under these circumstances, the pressure drag becomes a sizsable portion of the total parasite drag of the aircraft, and increases dramatically with only a small increase in aircraft velocity. The dramatic increase in drag caused by the onset of wave drag is generally called the drag rise because the drag coefficient rises almost exponentially with only a small increase in velocity as the shock waves forming on the aircraft strengthen. Most commercial jet aircraft operate in the transonic region, sufficiently below Mach 1.0 to avoid the drag rise, because it is very inefficient to attempt to propel the aircraft at a velocity at which wave drag is a significant component of the total drag.

Operation of an aircraft at transonic speeds presents a particular problem to the designer of the airfoils which provide lift and control to the aircraft. Such airfoils provide lift by accelerating the air over the upper surface of the airfoil to reduce the relative pressure on the upper airfoil surface. Unfortunately, the acceleration of air over the upper surface of the airfoil on an aircraft already operating at transonic speeds requires that the flow of air over the airfoil become supersonic. It is important to delay the onset of wave drag on a transonic airfoil in spite of the fact that the flow of air over the airfoil must be at least partially supersonic to allow the aircraft to fly as close to Mach 1.0 as possible without encountering an unacceptable and uneconomic increase in drag.

An airfoil designed to be efficient at transonic speeds is illustrated in U.S. Pat. No. 3,952,971 to Whitcomb, entitled "Airfoil Shape for Flight at Subsonic Speeds". The Whitcomb airfoil is typical of transonic airfoils in that the forward 60% of the airfoil is nearly symmetric, with the upper and lower surfaces having a very flat profile. The upper surface maintains its flat profile over the entire extent of the airfoil, tapering downwardly at the aft end. The lower surface has a more complex shape over the aft 40% of the airfoil, curving upwardly and then downwardly to merge with the upper surface at the trailing end of the airfoil.

The relatively flat upper surface of the Whitcomb airfoil results in the formation of a shock wave which is sufficiently weak so that wave drag is minimized and the onset of drag rise is delayed to higher speeds. The curvature of the aft 40% of the lower surface of the airfoil causes the wing to have a high degree of camber in this region, which provides a significant portion of the total lift. The symmetric nature of the forward 60% of the airfoil limits the ability of the Whitcomb airfoil, and transonic airfoils in general, to generate lift. Basically, transonic airfoils such as Whitcomb are effective at delaying the drag rise to a velocity higher than the design speed of the aircraft, but at the expense of lift performance relative to other types of airfoils.

An attempt to improve the lift performance of a transonic airfoil is illustrated in U.S. Pat. No. 4,858,852 to Henne and Gregg. Henne and Gregg add lift to the airfoil by providing divergence between the upper and lower surfaces of the airfoil at the trailing end, with the airfoil terminating at a relatively blunt base. This configuration has the desired characteristic of improving lift and delaying the onset of the drag rise, but increases the base drag. In addition, providing divergence to the upper and lower surfaces at the aft end means that the thinnest portion of the airfoil is at some distance from the trailing end. The diverging surfaces at the trailing end result in high relative pressures on the lower surface of the airfoil aft of the section of minimum thickness. These high pressures generate high hinge moments about the section of minimum thickness, which is typically the weakest point of the airfoil. Preserving the structural integrity of the airfoil without adding excessive weight is a particular problem in the Henne and Gregg design because of the large moments applied to the airfoil at its weakest point.

SUMMARY OF THE INVENTION

The present invention provides an improved trailing edge configuration for a transonic airfoil in which the upper and lower surfaces converge without diverging over the aft 40% of the airfoil chord. The upper and lower surfaces of the airfoil each have significantly increasing downward curvature at the aft end. The absolute value of the negative slope of the camber of the airfoil typically increases by at least 50% over the aft 4% of the chord, usually increasing by a factor of about 2. The negative slope of the camber of the airfoil typically reaches at least about −0.25 at the trailing edge of the airfoil, and in preferred designs, the slope of the camber changes from about −0.175 to about −0.325 over the aft 4% of the chord.

The dramatic increase in curvature over the aft approximately 4% of the airfoil provided by the present invention increases the lift capability of the airfoil relative to prior designs without significantly increasing drag. The increased lift provided by the aft portion of the airfoil of the present invention reduces the lift required from the forward portion thereof. A much smoother pressure distribution is obtained along the upper surface of the airfoil than in past designs because the shock wave at about the midpoint of the airfoil is significantly weakened. The forward portion of the airfoil can be redesigned to further minimize shock wave formation, or the airfoil can be flown at a higher Mach number without encountering the drag rise. In effect, the airfoil of the present invention is "faster" than the typical transonic airfoil because the effective speed of the airfoil can be increased without an unacceptable drag penalty.

The increased lift capability of the airfoil of the present invention and the resulting ability of the airfoil to fly "faster" provide the airfoil designer with the possibility of achieving several collateral effects. The sweep angle of the wing can be reduced without encountering the drag rise. Also, the wing can be made thicker while still achieving acceptable lift. Both decreasing the sweep angle and increasing wing thickness result in significant weight advantages (a thicker wing is lighter because it requires less structure—the same is true of a wing with less sweep which has less spar length for the same span). The airfoil design can thus be made more efficient at the same design Mach number, with the increased lift traded off for other benefits such as decreased weight. Alternatively, of course, the higher lift airfoil of the present invention can be used to increase the design speed of the aircraft.

The airfoil of the present invention, and airfoils in general, can be viewed as having upper and lower surfaces meeting at the leading and trailing ends of the airfoil. Positions along the airfoil are defined with reference to the "chord", a straight line running from the leading end to the trailing end of the airfoil. For example, the "40% chord position" designates a location 40% of the way from the leading to the trailing end of the chord line of the airfoil. The "camber line" is the line defining the mid point between the upper and lower surfaces of the airfoil extending from the leading to the trailing end thereof. The term "camber" traditionally refers to the distance between the camber line and the chord line, and the term "camber" is used herein to designate the camber line. In defining the present invention, reference is made to the "trailing edge" of the air foil, and also to the "trailing end". While these terms are sometimes used interchangeably, the term "trailing end" is used herein to define the absolute aft end of the airfoil, while the term "trailing edge" is used to define the aft portion, typically the aft 4% or so, of the airfoil.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
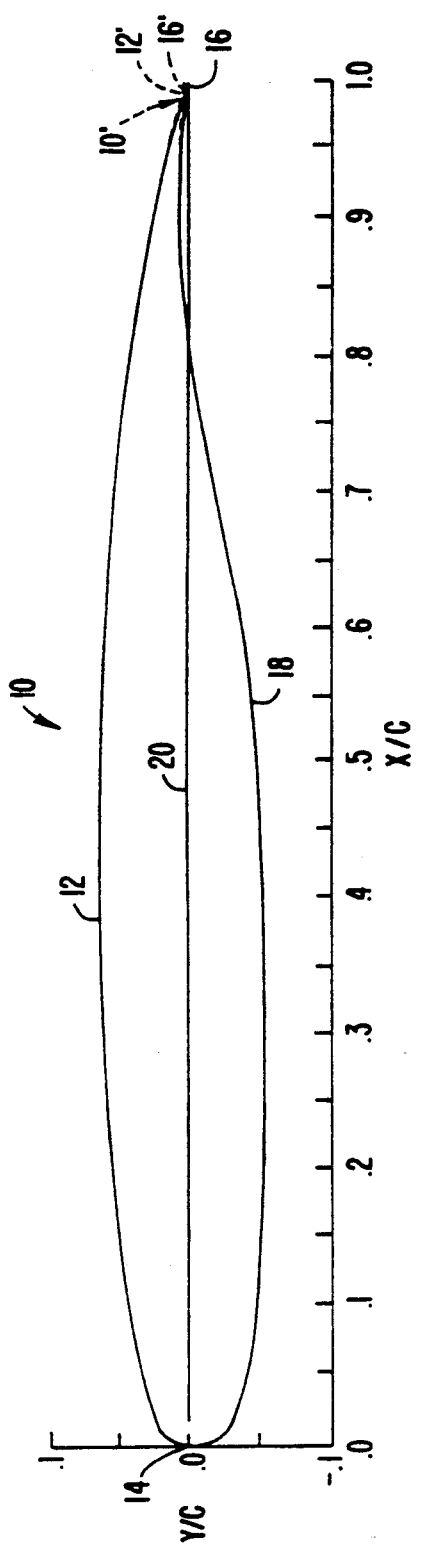
FIG. 1 is a schematic cross-section of a base line airfoil incorporating the preferred embodiment of the present invention.

A cross-section of the preferred embodiment of the transonic airfoil 10 of the present invention is illustrated schematically in FIG. 1. Airfoil 10 includes a smoothly cambered upper surface 12 running from the leading end 14 to the trailing end 16 of the airfoil. Airfoil 10 also includes a lower surface 18 running from leading end 14 to trailing end 16. The chord 20 of airfoil 10 is the theoretical straight line running from leading end 14 to trailing end 16 of the airfoil.

As is typical with transonic airfoils known in the art, upper surface 12 of airfoil 10 has a smooth cambered surface from leading end 14 to near the trailing end 16. Lower surface 18 is nearly symmetric to upper surface 12 about chord 20 over the first 50%-60% of the airfoil. However, over the aft 40%-50% of the airfoil, lower surface 18 curves upwardly and then downwardly to merge smoothly with upper surface 12 at trailing end 16. In FIG. 1, horizontal dimensions ("x/c") are plotted as a fraction of the chord length, from the zero position (0%) at leading end 14 to the 1.0 (100%) position at trailing end 16. Vertical dimensions ("y/c") are also plotted as a fraction of the chord length.

Figure 2:
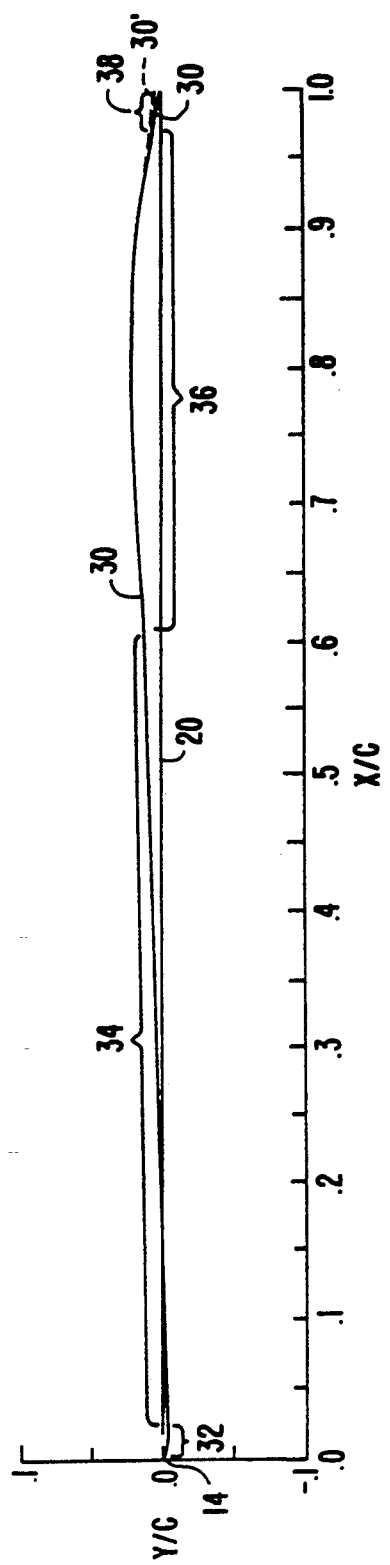
FIG. 2 is a graphical depiction of the camber of the preferred embodiment of FIG. 1.

The camber line or "camber" 30 of airfoil 10 is depicted diagrammatically in FIG. 2. As in FIG. 1, camber 30 in FIG. 2 is plotted vertically and horizontally as a percent of chord length. Camber 30 represents the vertical distance between the midpoint between the upper and lower airfoil surfaces (sometimes called the "mean line") and the chord line. Camber 30 has an initial portion 32 of significant curvature near leading end 14. However, the portion 34 of chord 30 extending from slightly behind leading end 14 to approximately the 60% position is relatively linear. In region 34, the slope (i.e., rise over distance) of chord 30 is approximately 0.05. Camber 30 begins to have more curvature at about the 50% to 60% chord position, showing significant upward and then downward curvature in the region 36 from about the 50%-60% chord position to about the 96% chord position.

Preferred embodiment 10 is identical to a base line airfoil 10′ except at the trailing edge, where the configuration of the base line airfoil is indicated by dash lines, with similar numbers used to show similar components. In FIGS. 1 and 2, the differences between base line airfoil 10′ and the preferred embodiment 10 are exaggerated for clarity. The trailing end 16 of preferred embodiment 10 is displaced significantly from the trailing end 16′ of base line airfoil 10′. Also, the camber 30 in preferred embodiment 10 (see FIG. 2) departs significantly from the chamber 30′ of base line airfoil 10′ at the trailing edge, with the camber of the preferred embodiment showing significantly more curvature. The present invention modifies the base line airfoil by providing significant downward curvature to the trailing edge in the region 38 comprising the aft 3.5% to 4% of the airfoil. This results in a significant increase in camber at the trailing edge as illustrated in FIG. 2 and gives the trailing edge a "curled" configuration.

Figure 3:
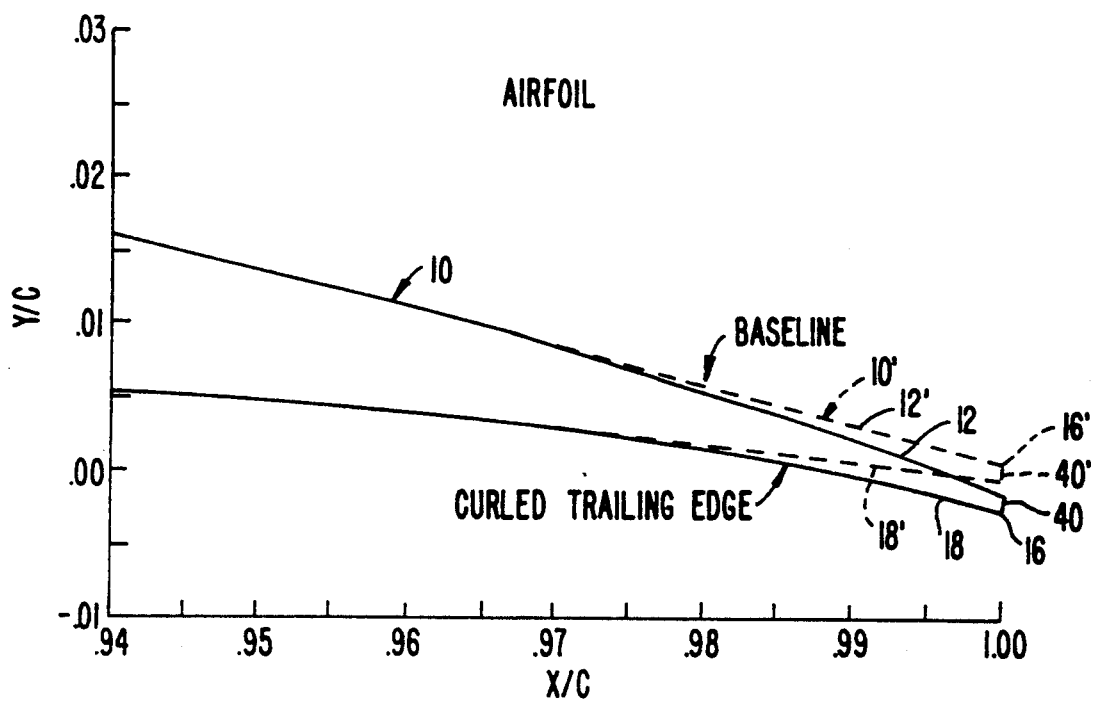
FIG. 3 is a schematic cross-section of the trailing edge of the embodiment of FIG. 1.

The difference between the trailing edge of the base line airfoil 10′, and that of the preferred embodiment 10 of the airfoil of the present invention, is illustrated more clearly by way of reference to FIG. 3. At the trailing edge of base line airfoil 10′, both the upper surface 12′ and the lower surface 18′ show little curvature, and terminate at a base 40′ at trailing end 16′. Base 40′ has a vertical dimension of approximately 0.1% of the chord length. The trailing edge of preferred airfoil 10, on the other hand, has upper and lower surfaces 12, 18 respectively in which the curvature increases substantially toward trailing end 16. As with the base line airfoil, preferred airfoil 10 terminates in a very narrow base 40 having a vertical dimension of about 0.1% of the chord length. The narrow base is desirable to minimize base drag, and a base having a vertical dimension of less than 0.2% of the chord is preferred.

Figure 4:
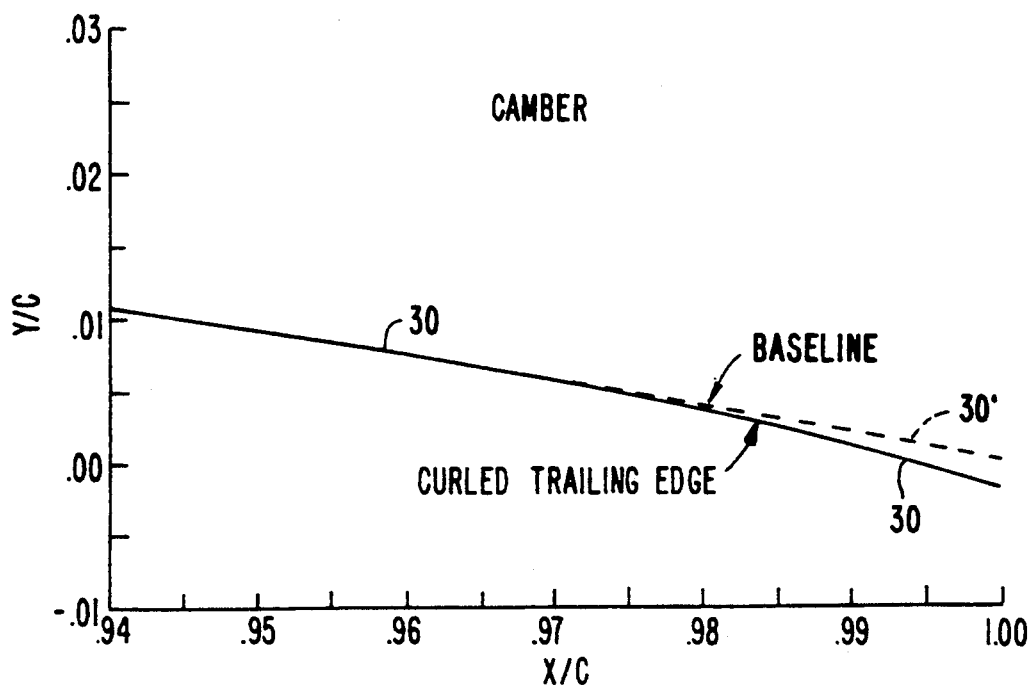
FIG. 4 is a graphical depiction of the camber of the trailing edge of the embodiment of FIG. 1.

Referring to FIG. 4, the camber 30 of the preferred airfoil is compared with the camber 30' of the aft portion of the base line airfoil. The camber 30 of the preferred airfoil has significant curvature over the last 3.5%-4% of the chord, compared to the base line airfoil where the camber 30' appears to be essentially linear. The curvature of the curled trailing edge of the airfoil of the present invention becomes more apparent in FIG. 5, where the slope of the camber (i.e., the first derivative of the camber line) is plotted for the base line airfoil and for the preferred embodiment of the present invention.

Figure 5:
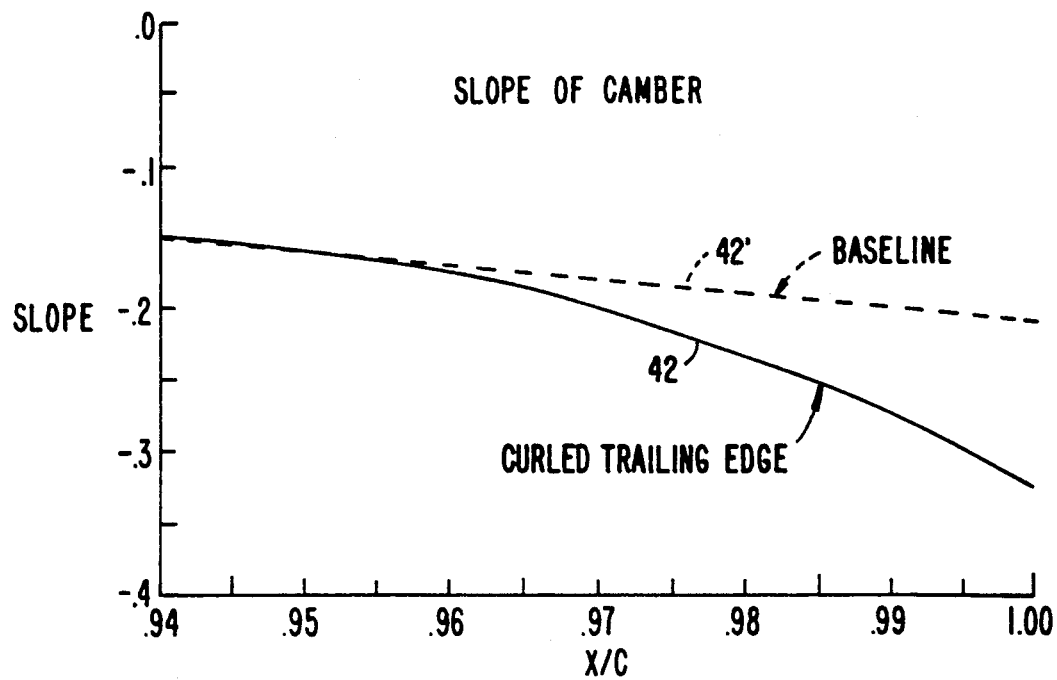
FIG. 5 is a graphical depiction of the slope of the camber of the embodiment of FIG. 1.

Referring to FIG. 5, it is apparent that the slope 42' of the camber of the base line airfoil 10' remains almost linear up to the trailing end. However, the slope 42 of the camber of preferred embodiment 10 shows significant non-linearity starting at about the 96% chord position. In particular, the camber slope 42 of preferred embodiment 10 changes from about −0.175 at the 96% chord position to about −0.325 at the aft end of the airfoil. In contrast, the camber slope 42' of base line airfoil 10 changes only from about −0.175 at the 96% chord position to about −0.200 at the aft end of the airfoil. Basically, the absolute value of the camber slope 42 of the preferred embodiment increases by more than 50%, and indeed almost by a factor of 2, over the aft 4% of the airfoil.

Figure 6:
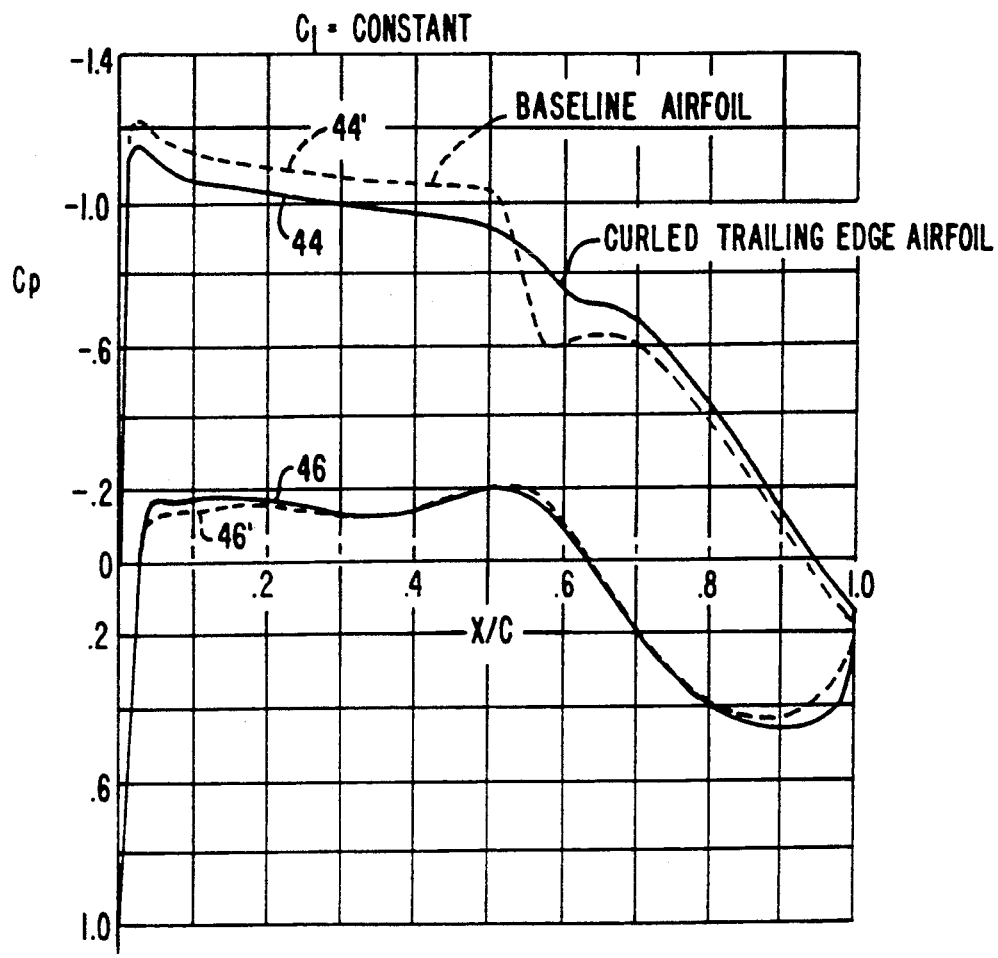
FIG. 6 is a graph of the pressure coefficient on the upper and lower surfaces of the embodiment of FIG. 1.

The significance of the curled trailing edge of the preferred embodiment of the present invention is illustrated graphically in FIG. 6, which plots the pressure co-efficient for the upper and lower airfoil surfaces as a function of chord length. The upper solid line 44 depicts the pressure coefficient on the upper surface of the preferred embodiment, while the lower solid line 46 depicts the pressure coefficient on the lower surface of the airfoil. Dash lines 44' and 46' depict equivalent pressure coefficients for the base line airfoil having the same lift coefficient (i.e., providing the same amount of lift) as the airfoil of the present invention. The total lift of the airfoil is essentially the sum of the area between the respective pressure coefficients for the upper and lower surfaces of the airfoil. For maximum lift, the pressure coefficient on the upper surface should be as high (in a negative direction) as possible, while the pressure coefficient on the lower surface should be as low (in a positive direction) as possible.

In FIG. 6, it is apparent that the airfoil of the preferred embodiment provides significantly more lift over the aft 47% of the airfoil than the base line airfoil. Specifically, the upper surface pressure coefficient 44 is significantly higher for the preferred embodiment than for the base line airfoil aft of the 53% chord position, meaning that the pressures on the upper surface are lower. Correspondingly, the lower surface pressure coefficient 46 is greater over the aft 50% or so of the airfoil for the preferred embodiment relative to the base line airfoil.

The increased lift over the aft portion of the preferred embodiment of the airfoil of the present invention reduces the lift required from the forward portion thereof. Accordingly, to maintain the lift coefficient (i.e., total lift) equal for both the preferred embodiment and for the base line airfoil, the upper surface pressure coefficient 44 is significantly less (in a negative direction) over the forward half of the preferred embodiment than the base line airfoil. By decreasing the lift requirement over the forward portion of the airfoil, the required local velocity of the air is effectively reduced, meaning that the shock wave which necessarily exists at about the 50%-60% chord position is significantly weaker.

In FIG. 6, the upper surface pressure coefficient 44' for the base line airfoil increases slightly from the 60%-65% chord positions. This complex profile results from the shock wave which exists on the upper surface of the airfoil at about the 50% chord position. The shock wave causes the velocity of the air to decrease abruptly, causing a sudden increase in the pressure coefficient (i.e., the pressure increases, making the coefficient less negative). The air then accelerates briefly, causing the pressure coefficient to drop, before increasing again towards the trailing end of the airfoil.

Because the local velocity for the upper surface of the airfoil is significantly reduced in the preferred embodiment, the change in shape of the upper surface pressure coefficient may be far less dramatic at the design transonic speed of the airfoil. The shock wave at about the midpoint of the airfoil has been virtually eliminated at the same lift because the speed of the air is lower prior to the shock. The deceleration of the air is much smoother through and immediately after the shock wave. Essentially, the airfoil of the present invention provides a smooth decrease in the upper surface pressure coefficient 44 from near the front end to near the aft end of the airfoil. Coupled with the additional pressure on the lower surface at the aft end surface, the airfoil of the preferred embodiment demonstrates lift performance which is considerably superior to the base line airfoil.

While a preferred embodiment of the present invention has been illustrated in detail, it is apparent that modifications and adaptations of that embodiment will occur to those skilled in the art. It is to be expressly understood that such modifications and adaptations are within the spirit and scope of the present invention, as set forth in the following claims.

What is claimed is:

1. In a transonic airfoil comprising upper and lower surfaces meeting at the leading and trailing ends of the airfoil and having a chord line extending between said leading and trailing ends and a camber line representing the curvature of the airfoil, an improved trailing edge configuration in which the upper and lower surfaces of the airfoil converge without diverging over about the aft 4% of the chord, said upper and lower surfaces each having increasing downward curvature at the aft end of the airfoil so that the absolute value of the negative slope of the camber increases by at least about 50% over the aft 4% of the chord.

2. The transonic airfoil of claim 1 wherein the absolute value of the negative slope of the camber increases by a factor of about 2 over the aft 4% of the chord.

3. The transonic airfoil of claim 1 wherein the negative slope of the camber changes from between about −0.1 to −0.2 at the 96% chord position to between about −0.25 to −0.4 at the 100% chord position.

4. The transonic airfoil of claim 1 wherein the negative slope of the camber changes from about −0.175 to about −0.325 from the 96% chord position to the 100% chord position.

5. The transonic airfoil of claim 1 wherein the trailing end of said airfoil has a vertical thickness no greater than about 0.2% of the length of the chord.

6. The transonic airfoil of claim 1 wherein the trailing end of said airfoil has a vertical thickness of about 0.1% of the length of the chord.

7. The transonic airfoil of claim 1 wherein the camber has a slope of about 0.05 over the forward approximately 5% to 60% of the chord, and has a positive and then a negative slope over the aft approximately 40% of the airfoil with the camber having a slope in the range of about −0.1 to −0.2 at the approximately 96% chord position.

8. The transonic airfoil of claim 1 wherein the pressure coefficient on the upper surface of the airfoil increases without decreasing from the 10% to the 90% chord position at the design transonic speed of the airfoil.

9. The transonic airfoil of claim 1 wherein flow separation from the upper surface of the airfoil is avoided at the design transonic speed of the airfoil.

10. In a transonic airfoil comprising upper and lower surfaces meeting at the fore and aft ends of the airfoil and defining a chord between said fore and aft ends, the airfoil having camber with a relatively linear slope over the forward approximately 5% to 60% of the chord, and having significant change in the slope of the camber over the aft approximately 40% of the airfoil with the camber having a negative slope in the range of about −0.1 to −0.2 at the approximately 96% chord position, an improved trailing edge configuration in which the aft approximately 4% of the camber of the airfoil has a negative slope with an absolute value which increases by greater than 50% from the 96% to the 100% chord position, the upper and lower surfaces converging without diverging in an aft direction throughout said aft 4% of the chord.

11. The transonic airfoil of claim 10 wherein the absolute value of the negative slope of the camber increases by a factor of about 2 from the 96% to the 100% chord position.

12. The transonic airfoil of claim 10 wherein the absolute value of the negative slope of the camber increases so that the slope of the camber is between about −0.25 to −0.4 at the 100% chord position.

13. The transonic airfoil of claim 10 wherein the absolute value of the negative slope of the camber increases so that the slope of the camber changes from about −0.175 to about −0.325 from the 96% chord position to the 100% chord position.

14. The transonic airfoil of claim 10 wherein the trailing end of said airfoil has a vertical thickness no greater than about 0.2% of the length of the chord.

15. The transonic airfoil of claim 10 wherein the trailing end of said airfoil has a vertical thickness of about 0.1% of the length of the chord.

16. An improved trailing edge for a transonic airfoil having a chord extending from the leading end to the trailing end of the airfoil, said trailing edge comprising an upper surface and a lower surface converging without diverging over the aft 4% of the chord to form the trailing edge of said airfoil having a vertical thickness no greater than about 0.2% of the length of the chord, said upper and lower surfaces each having downward curvature throughout about the aft 4% of the chord so that the camber of the airfoil has a negative slope of at least about −0.25 at the trailing end of the airfoil.

17. The improved trailing edge of claim 16 wherein the absolute value of the negative slope of the camber increases by a factor of at least 50% over the aft 4% of the chord.

18. The improved trailing edge of claim 16 wherein the absolute value of the negative slope of the camber increases by a factor of about 2 over the aft 4% of the chord.

19. The improved trailing edge of claim 16 wherein the absolute value of the negative slope of the camber increases so that the slope of the camber changes from between about −0.1 to −0.2 at the 96% chord position to between about −0.25 to −0.4 at the 100% chord position.

20. The improved trailing edge of claim 16 wherein the negative slope of the camber increases from about −0.175 to about −0.325 from the 96% chord position to the 100% chord position.

21. The transonic airfoil of claim 16 wherein the trailing end of said airfoil has a vertical thickness of about 0.1% of the length of the chord.

* * * * *